United States Patent [19]

Meixner

[11] 4,306,462
[45] Dec. 22, 1981

[54] SYSTEM FOR MEASURING TORQUE AND SPEED OF ROTATING SHAFT

[75] Inventor: Edwin J. Meixner, Mt. Prospect, Ill.

[73] Assignee: Borg-Warner Corporation, Chicago, Ill.

[21] Appl. No.: 128,697

[22] Filed: Mar. 10, 1980

[51] Int. Cl.³ .................................................. G01L 3/10
[52] U.S. Cl. ................................ 73/862.36; 73/862.28
[58] Field of Search .......... 73/136 A, DIG. 2, 862.28, 73/862.36; 324/164

[56] References Cited

U.S. PATENT DOCUMENTS 4,100,794 7/1978 Meixner .............................. 73/136 A
4,106,334 8/1978 Studtmann ......................... 73/136 A Primary Examiner—Charles A. Ruehl
Attorney, Agent, or Firm—James E. Tracy

[57] ABSTRACT

A magnetic transducer fits over a rotatable shaft and has a primary winding that is a-c energized by an a-c excitation signal to produce a magnetic field, adjacent to the shaft, which changes as the shaft is torsionally stressed when torque is applied thereto. This stressing causes compression and tension in the shaft which alter the shaft permeability and thus vary the magnetic flux pattern in the shaft. The magnetic field is also a function of the shaft speed due to the shaft's armature reaction, eddy currents being generated in the shaft which develop a magnetic field that opposes and distorts the field produced by the primary winding. A pair of secondary windings in the transducer produce differently modulated excitation signals which are then processed to provide a pair of suppressed carrier signals amplitude modulated at different phases by the torque and speed parameters of the shaft. Synchronous detectors are employed to demodulate the suppressed carrier signals to provide separate torque and speed information signals.

8 Claims, 3 Drawing Figures

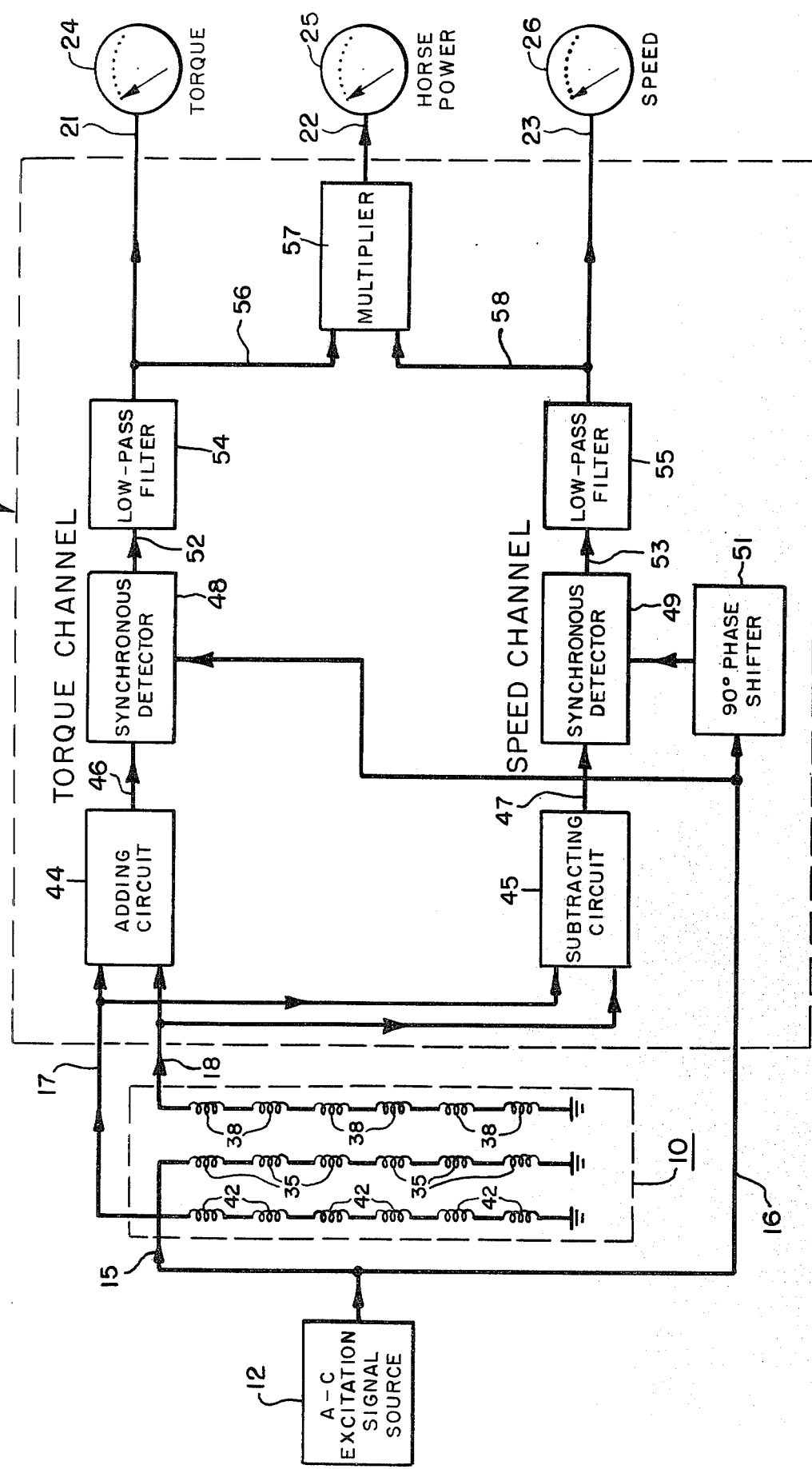

SYSTEM FOR MEASURING TORQUE AND SPEED OF ROTATING SHAFT

BACKGROUND OF THE INVENTION

This invention relates to a detecting system for sensing a rotatable shaft to determine its speed and torque.

Systems have been developed having transducers for producing a magnetic field adjacent to a rotating shaft and for measuring the changes in that magnetic field to provide information regarding different shaft characteristics, such as speed, torque and horsepower. It has been known that as a driven or loaded shaft is torsionally stressed, compression and tension occur in various portions of the shaft and this changes the shaft permeability and consequently the magnetic flux pattern in the shaft thereby to alter the magnetic field. A torque information signal may be developed from the altered magnetic field. Such a system is disclosed in U.S. Pat. No. 4,100,794, issued July 18, 1978 in the name of Edwin J. Meixner, and which is assigned to the assignee of the present invention. In addition, it is recognized in U.S. Pat. No. 4,100,794 that the magnetic field also varies as a function of the shaft speed due to the armature reaction in the shaft. Eddy currents will flow on the surface of the rotating shaft and produce a counter magnetic field which opposes and distorts the original magnetic field. The faster the rotational speed, the greater the eddy current flow and the greater the amount of field distortion. As a result, the resultant magnetic field may be used to generate a speed-indicating signal.

While the amplitudes of the torque and speed signals vary linearly with respect to the actual torque and speed, respectively, as those parameters approach zero in the system of U.S. Pat. No. 4,100,794, with the present invention the linearity of both of those torque and speed signals may be extended all the way to and through zero torque and zero RPM respectively. This, of course, improves the performance.

SUMMARY OF THE INVENTION

A detecting system, constructed in accordance with the invention, provides information regarding the torque and speed of a rotatable permeable shaft. The system comprises a magnetic transducer encompassing the rotatable shaft and which includes first, second and third magnetic cores, a primary winding wound on the first magnetic core, a first secondary winding wound on the second magnetic core, and a second secondary winding wound on the third magnetic core. An energizing signal source provides an a-c excitation signal having a predetermined frequency very high relative to any torque or speed changes. There are means for supplying the a-c excitation signal to the primary winding to produce a magnetic field, adjacent to the rotatable shaft, which is a function of the rotational speed of the shaft and the torque on the shaft. As a result, the first secondary winding develops, from the magnetic field, a first modulated excitation signal having phase-opposed torque and speed components, and the second secondary winding develops, from the magnetic field, a second modulated excitation signal having inphase torque and speed components, the first and second modulated excitation signals essentially constituting amplitude modulated suppressed carrier signals. Means, including adding and subtracting circuits, combine the first and second modulated excitation signals from the transducer to produce a first suppressed carrier signal whose amplitude is modulated at zero phase by the torque parameter of the rotatable shaft and a second suppressed carrier signal which is amplitude modulated at quadrature phase by the speed parameter of the shaft. First and second synchronous detectors respectively receive the first and second amplitude modulated suppressed carrier signals. Finally, the detecting system comprises means for supplying the excitation signal, from the energizing signal source, at zero phase to the first synchronous detector and 90° phase-displaced to the second synchronous detector in order to provide the detectors with the carrier signals required to demodulate the first and second amplitude modulated suppressed carrier signals and produce therefrom separate torque-indicating and speed-indicating signals.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which like reference numbers identify like elements, and in which:

FIG. 3 is a more detailed schematic illustration of the detecting system of FIG. 1.

DETAILED DESCRIPTION OF THE INVENTION

Figure 1:
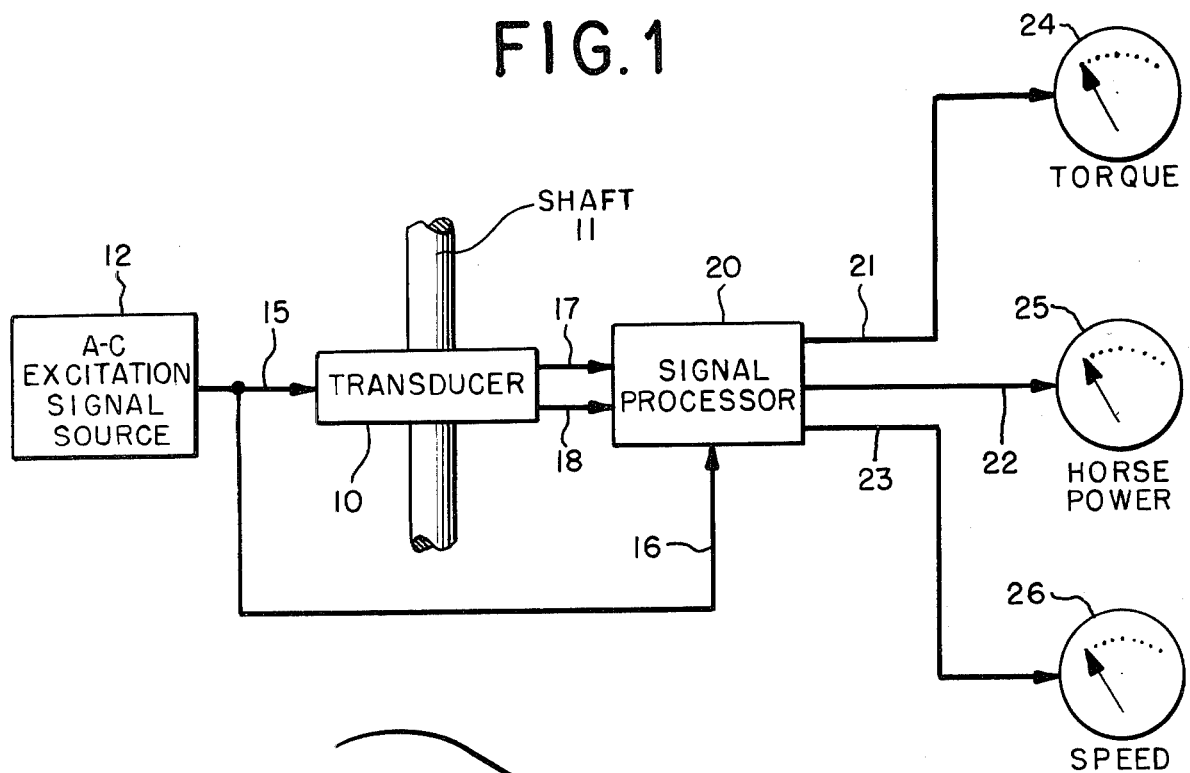
FIG. 1 is a block diagram of a detecting system, having a magnetic transducer, constructed in accordance with the invention.

FIG. 1 depicts in a general manner the detecting system of this invention. As there shown a magnetic transducer 10 is positioned around a rotatable shaft 11. The means for driving the shaft and the load driven by the shaft are not indicated, as they are not important for understanding the invention. For example, and as taught in U.S. Pat. No. 4,100,794, the transducer may sense the torque and speed of one of the drive components in a motor vehicle. Thus, to sense driveline torque and speed transducer 10 may be mounted over a portion of the output shaft which extends from the transmission housing and is usually coupled to a universal joint for delivering torque to the drive wheels of the vehicle.

As will become apparent hereinafter, the transducer includes a primary winding, having a plurality of series-connected coils, for producing a magnetic flux in the portion of shaft 11 adjacent the transducer. To energize the transducer primary winding, input a-c energy from an a-c excitation signal source 12 may be applied over line 15, which may be a single conductor or a conductor pair as in the case with all of the other lines shown in the drawings. When the detecting system is used in a fixed location, energizing signal source 12 may be a 60 hertz, 115 a-c line voltage source. On the other hand, when the detecting system is mounted in a motor vehicle, signal source 12 may comprise an inverter which is powered by the vehicle's battery. Preferably, the inverter will be operated so that the a-c excitation signal on line 15 will have a frequency of around 400 hertz. Of course, whether the frequency is 60 hertz or 400 hertz it will always be very high relative to any torque or speed changes of shaft 11.

A pair of output signals from the transducer are translated over lines 17 and 18 to a signal processor circuit 20 which also receives, over line 16, the a-c excitation signal from source 12. Separate output conductors 21, 22 and 23 are provided to supply signals to the respective meters 24 for indicating torque, 25 for depicting the horsepower, and 26 to indicate the speed or shaft RPM. Of course, each of the signals representing the torque, horsepower and speed parameters may be supplied to any appropriate recording unit or other data-receiving instrument. For example, the speed-indicating signal on line 23 may be used to actuate an odometer or a speedometer. On the other hand, the torque-indicating signal on line 21 may be employed to regulate the change of gear ratio in an automatic transmission. Moreover, there need not be three separate conductors, or conductor pairs, to depict two or three output quantities. A single meter can be used to display different parameters in conjunction with a switch or multiplexer which is actuable to select different quantities from the signal processor circuit at different times for display or recording.

Figure 2:
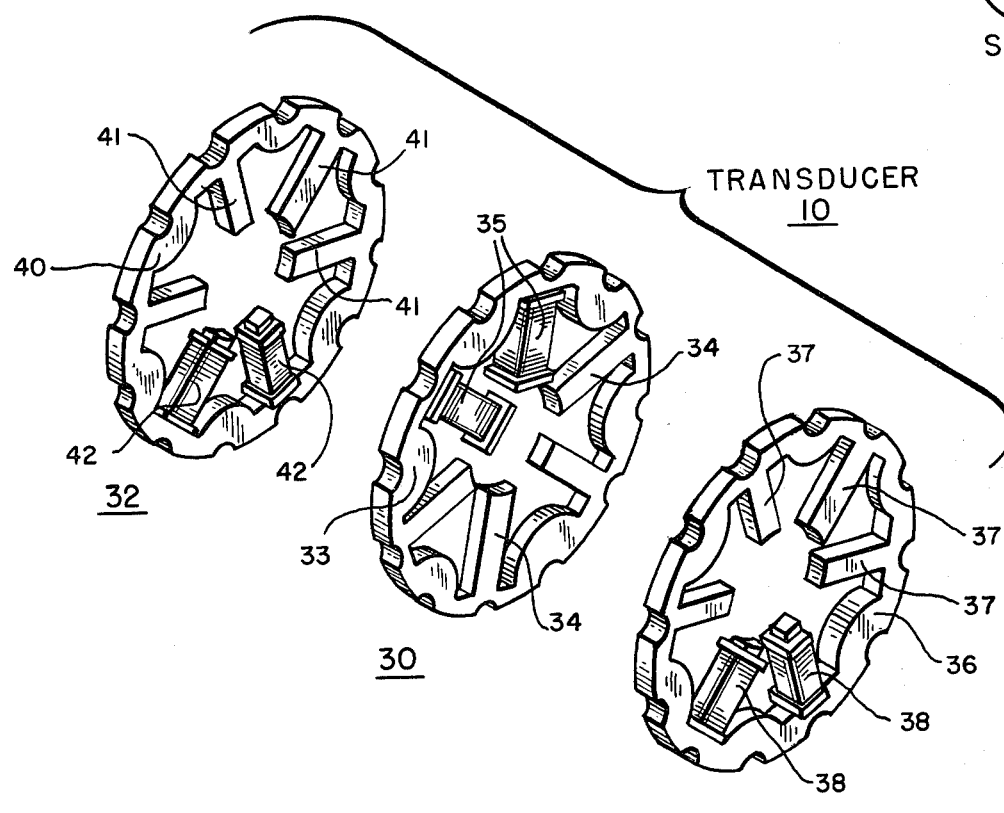
FIG. 2 is an exploded perspective view of certain components of the transducer.

In the exploded view of FIG. 2, transducer 10 has three different core assemblies 30, 31 and 32. The first magnetic core assembly 30 includes a generally circular outer portion 33 and six radial pole pieces 34 extending radially inwardly to a position near the outer surface of the shaft when the transducer encompasses the shaft as shown in FIG. 1. Preferably, each core is made of powdered metal. Six individual coils 35 (only two of which are shown in FIG. 2) are provided, with one of the coils 35 being disposed or wound on each of the six pole pieces 34. The six individual coils 35 are series-connected to provide a primary winding as will be explained subsequently in connection with FIG. 3.

The second and third magnetic core assemblies 31 and 32 are generally similar to assembly 30. Hence, the second magnetic core 31 also includes an outer portion 36 and a plurality of pole pieces 37 each of which supports a coil 38. The third magnetic core assembly 32 likewise includes a circular outer portion 40, from which a plurality of individual pole pieces 41 extend radially inwardly toward the normal shaft position. The individual winding coils 42 are respectively disposed on the pole pieces 41 of the third assembly. The individual cores are positioned adjacent to, and oriented with respect to, each other as shown. Note that the pole pieces 37 and 41 in the second and third magnetic cores are each angularly offset with respect to the positions of the pole pieces 34 in the first magnetic core 30. In other words, in the preferred embodiment, each of the pole pieces 37, 41 is positioned midway between two of the adjacent pole pieces 34 of the central or first magnetic core 30.

FIG. 3 shows the portions of the signal processor circuit 20 in block form, and further depicts the windings of the transducer and their electrical connections. As is evident from FIG. 3, the six coils 35 on the first magnetic core assembly are series-connected and form the primary winding of transducer 10. Thus, the a-c excitation signal from source 12 will be applied to the primary winding 35 to produce an alternating magnetic field adjacent to the rotatable shaft 11, the magnetic field being a function of the rotational speed of the shaft and the torque applied to the shaft. In effect, the alternating magnetic field produced by the excitation signal is modified as the shaft speed and/or torsional stresses in the shaft change. The six coils 42 are series-connected and provide one secondary or pick-up winding in transducer 10, while the six series-connected coils 38 constitute a second secondary or pick-up winding.

With this arrangement, the magnetic field adjacent the shaft will induce into secondary winding 42 a modulated excitation signal having phase-opposed (namely 180° out of phase) torque and speed components, whereas secondary winding 38 develops, from the magnetic field, a modulated excitation signal having inphase torque and speed components, the two modulated excitation signals essentially constituting amplitude modulated suppressed carrier signals. In effect, the output signal from secondary winding 42 represents the torque minus the speed, while the output signal from secondary winding 38 represents the torque plus the speed. By adding the two secondary signals in adding circuit 44 to cancel the speed information and by subtracting those two signals in subtracting circuit 45 to cancel the torque information, there will be produced, on line 46, a first suppressed carrier signal whose amplitude is modulated at zero phase by the torque parameter of the rotatable shaft and, on line 47, a second suppressed carrier signal which is amplitude modulated at quadrature phase by the speed parameter of the shaft. Of course, by reversing the secondary windings the phase of the torque and speed components are reversed, the adding circuit therefore producing the speed information while the subtracting circuit derives the torque information. In any event, however, the torque information will always be modulated on the suppressed carrier at zero phase (namely, the same phase as the carrier component) whereas the speed information will be modulated at quadrature phase, namely, at an angle 90° displaced from the carrier component.

Demodulation of the two amplitude modulated suppressed carrier signals, on lines 46 and 47, occurs in synchronous detectors 48 and 49 which may take any one of a variety of different well known constructions. Since the amplitude variations of the signal on line 46 at zero phase (relative to the a-c excitation signal at the output of source 12) represent the torque information, and since the amplitude variations of the signal on line 47 at quadrature phase (relative to the same a-c excitation signal) represent the speed information, the a-c excitation signal is supplied at zero phase (namely, inphase) to detector 48 and 90° phase-displaced (by means of phase shifter 51) to detector 49 in order to provide those detectors with the carrier signals required to demodulate the two amplitude modulated suppressed carrier signals and produce therefrom separate torque-indicating and speed-indicating signals on lines 52, 53 respectively. Filters 54 and 55 are provided to remove any carrier signal components that may be included in the signals on lines 52 and 53. The output of filter 54 is coupled over line 21 to torque-indicating meter 24 and, over line 56, to one input of a multiplying circuit 57. The output signal from first filter 55 is coupled over line 23 to the speed of RPM meter 26 and, over line 58, to the other input of the multiplying stage 57. The multiplier operates in a well known manner to provide an output signal which varies as a product of the torque-indicating and speed-indicating signals received over lines 56 and 58. Accordingly, the output signal of multiplier 57, which is translated over line 22 to horsepower meter 25, is a true indication of the horsepower delivered by the shaft 11.

As described in U.S. Pat. No. 4,100,794, the sense or polarity of both the torque and speed signals may be detected to indicate whether torque is being passed from a driving unit over the shaft to a load, or whether the load is in fact returning power over the shaft toward the power source. This occurs, for example, in a motor vehicle when the vehicle itself is acting as a braking force over the drive shaft to the engine. A true four-quadrant indicating system may thus be produced, in that both the positive and negative torque and speed signals can be provided. To explain further, with the engine driving the output shaft and the vehicle travelling in the forward direction, the speed-torque relationship or curve will fall in the first quadrant. In the situation where the motor vehicle is coasting downhill, the speed is still positive but the torque sign is reversed, and the resultant speed-torque relationship lies in the fourth quadrant. When the vehicle is driven in reverse, both speed and torque are negative, and the speed-torque curve is in the third quadrant. The speed-torque relationship falls in the second quadrant under conditions where the vehicle is in reverse and coasting downhill. With the present invention, it has been found that the torque-speed curve can be made linear all the way down to and through zero RPM to the next quadrant, thereby improving performance.

To very briefly summarize the detecting system of the present invention, magnetic transducer 10, which is energized by an a-c excitation signal from source 12, senses both the torque applied to shaft 11 and the rotational speed of the shaft. Circuits 44 and 45, together with transducer 10, produce, on line 46, a first suppressed carrier signal whose amplitude is modulated at zero phase by the torque parameter of the shaft and, on line 47, a second suppressed carrier signal whose amplitude is modulated at quadrature phase by the speed parameter of the shaft. Synchronous detectors 48 and 49, phase shifter 51 and signal source 12 provide demodulating means for demodulating the first and second amplitude modulated suppressed carrier signals to produce (on lines 52 and 53) separate torque-indicating and speed-indicating signals.

While a particular embodiment of the invention has been shown and described, modifications may be made, and it is intended in the appended claims to cover all such modifications as may fall within the true spirit and scope of the invention.

I claim:

1. A detecting system for providing information relative to the torque and speed of a rotatable shaft, comprising:
   a magnetic transducer, energized by an a-c excitation signal, for sensing the torque applied to the shaft and the rotational speed of the shaft;
   means, including said magnetic transducer, for producing a first suppressed carrier signal whose amplitude is modulated at zero phase by the torque parameter of the shaft and a second suppressed carrier signal whose amplitude is modulated at quadrature phase by the speed parameter of the shaft;
   and demodulating means, including a pair of synchronous detectors, for demodulating the first and second amplitude modulated suppressed carrier signals to produce separate torque-indicating and speed-indicating signals.

2. A detecting system according to claim 1 wherein said magnetic transducer responds to the torsional stresses developed by the loading of the shaft in order that the first amplitude modulated suppressed carrier signal will represent the torque information, and wherein said magnetic transducer responds to the armature reaction of the shaft so that the second amplitude modulated suppressed carrier signal will represent the speed information.

3. A detecting system according to claim 1 wherein said a-c excitation signal produces an alternating magnetic field, adjacent to the shaft, which is modified as the shaft speed and/or torsional stresses in the shaft change, and wherein said transducer includes pick-up coils to produce a pair of output signals in response to the magnetic field, one of the output signals having torque and speed signal components that are essentially in phase, while the other output signal has torque and speed signal components that are essentially 180° out of phase, the first and second amplitude modulated suppressed carrier signals being developed from the two output signals from said transducer.

4. A detecting system for providing information regarding the torque and speed of a rotatable permeable shaft, comprising:
   a magnetic transducer encompassing the rotatable shaft and including first, second and third magnetic cores, a primary winding wound on said first magnetic core, a first secondary winding wound on said second magnetic core, and a second secondary winding wound on said third magnetic core;
   an energizing signal source for providing an a-c excitation signal having a predetermined frequency very high relative to any torque or speed changes;
   means for supplying said a-c excitation signal to said primary winding to produce a magnetic field, adjacent to the rotatable shaft, which is a function of the rotational speed of the shaft and the torque on the shaft,
   said first secondary winding developing, from the magnetic field, a first modulated excitation signal having phase-opposed torque and speed components, and said second secondary winding developing, from the magnetic field, a second modulated excitation signal having inphase torque and speed components, said first and second modulated excitation signals essentially constituting amplitude modulated suppressed carrier signals;
   means, including adding and subtracting circuits, for combining said first and second modulated excitation signals from said transducer to produce a first suppressed carrier signal whose amplitude is modulated at zero phase by the torque parameter of the rotatable shaft and a second suppressed carrier signal which is amplitude modulated at quadrature phase by the speed parameter of the shaft;
   a first synchronous detector to which is applied the first amplitude modulated suppressed carrier signal;
   a second synchronous detector to which is applied the second amplitude modulated suppressed carrier signal;
   and means for supplying said excitation signal, from said energizing signal source, at zero phase to said first synchronous detector and 90° phase-displaced to said second synchronous detector in order to provide said detectors with the carrier signals required to demodulate the first and second amplitude modulated suppressed signals and produce therefrom separate torque-indicating and speed-indicating signals.

5. A detecting system according to claim 4 wherein each of said magnetic cores, in said transducer, has a generally circular outer portion and at least four radial pole pieces extending radially inwardly from the circular outer portion toward the outer surface of the rotatable shaft, leaving room for the shaft to extend through the space defined by the ends of the pole pieces; wherein each of said windings includes at least four series-connected coils each of which is disposed on a respective one of the pole pieces of its associated magnetic core; and wherein the three magnetic cores are oriented such that the pole pieces in said second and third cores are angularly offset with respect to the adjacent pole pieces in said first core, each pole piece in said second and third cores being disposed at an angular position midway between the adjacent pole pieces in said first core.

6. A detecting system according to claim 4 wherein said adding circuit adds said first and second modulated excitation signals from said transducer to produce said first amplitude modulated suppressed carrier signal and wherein said subtracting circuit subtracts said second modulated excitation signal from said first modulated excitation signal to develop said second amplitude modulated suppressed carrier signal.

7. A detecting system according to claim 4 wherein each of said synchronous detectors is followed by a low-pass filter to remove any carrier signal components in said torque-indicating and speed-indicating signals.

8. A detection system according to claim 4 and including a multiplying circuit for multiplying said torque-indicating and speed-indicating signals to produce a horsepower-indicating signal which is a function of and represents the horsepower delivered by the shaft.

* * * * *

UNITED STATES PATENT AND TRADEMARK OFFICE
CERTIFICATE OF CORRECTION

PATENT NO. : 4,306,462

DATED : December 22, 1981

INVENTOR(S) : Edwin Joseph Meixner

It is certified that error appears in the above—identified patent and that said Letters Patent is hereby corrected as shown below:

Column 6, line 64, after "suppressed" insert -- carrier --.

Signed and Sealed this

Twenty-fourth Day of August 1982

[SEAL]

Attest:

GERALD J. MOSSINGHOFF

Attesting Officer     Commissioner of Patents and Trademarks